United States Patent Office 3,477,984
Patented Nov. 11, 1969

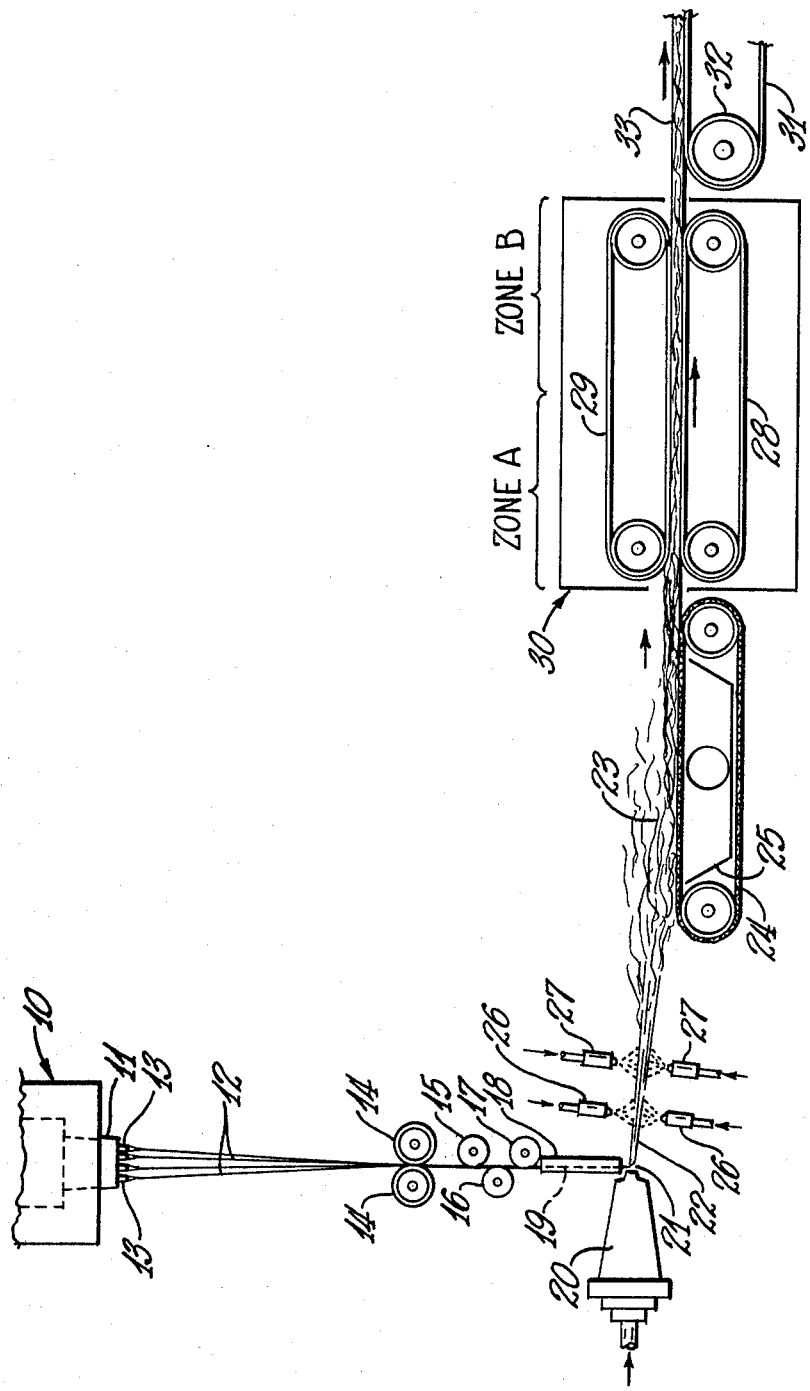

3,477,984
INSULATING MATERIAL
Edward B. Bahnsen, Jr., Los Gatos, Calif., assignor to Owens-Corning Fiberglas Corporation, a corporation of Delaware
Filed Sept. 12, 1966, Ser. No. 578,832
Int. Cl. C08g 51/10
U.S. Cl. 260—38                                    4 Claims

ABSTRACT OF THE DISCLOSURE

Improvement in the method for producing glass fiber products which involves heating loosely intermeshed glass fibers and a binder comprising a phenolic resole and an emulsion of a polysiloxane, and where the fibers contain a sufficiently high proportion of alkali metal oxide that cations thereof preferentially occur at the fiber surfaces: the improvement involves using a polysiloxane emulsion containing an amount at least substantially equivalent to the alkali metal cations on the fiber surfaces, a hydrochloride or hydrobromide of an amine having the general formula $$R-NH-CH_2-CH_2-CH_2-NH_2$$

where R represents unbranched alkyl groups having from 8 to 20 carbon atoms.

---

This invention relates to improved glass fiber insulation, and more specifically it relates to glass fiber insulation having improved moisture repellence.

Glass fiber insulation has long been used with excellent results in the building industry, the aircraft industry, and elsewhere. Glass fiber insulation mats serve to dampen sound and also act as thermal insulators. These insulating materials have been used in the aircraft industry in the frames of airplanes in order to deaden outside noise such as engine noise, and for thermal insulation purposes. These materials are lightweight and economical, and are, therefore, ideally suited for the aircraft industry where weight saving is so important.

Weight saving is important since, in general, the less the fixed weight of the aircraft, the faster it can go and the greater payload it can carry, assuming the engine thrust remains constant.

Due to the constantly changing atmospheric conditions which aircraft, particularly jet aircraft, are subjected to, glass fiber insulation has a tendency to pick up moisture during flight, thereby adding to the fixed weight of the aircraft. For the reason stated above, this is undesirable.

It is especially important to keep the weight of military aircraft to a minimum since superiority of one aircraft over another is usually measured by comparative speed and rate of climb, both of which factors are affected by the weight of the aircraft. Thus, in planning aircraft certain specifications are set up for the component parts, and must be met by the supplier. The moisture repellent glass fiber insulation of this invention is designed to meet military specification MIL-B-5924B.

Moisture repellent glass fiber insulation has been made heretofore using silicone polymers in the binder compositions. These polymers bond to some glass fibers to form moisture repellent surfaces on the fibers. The silicone polymers are preferably added to the glass fibers as a part of the resinous binder composition. Because of possible fire hazards and because of the cost of non-flammable solvents, most binder compositions are aqueous solutions. Inasmuch as most binder compositions are aqueous solutions, and most silicone polymers are not water soluble, it has been found necessary to incorporate the silicone polymers into the binder compositions in the form of emulsions. Such emulsions are described in U.S. Patent 2,660,736.

It has been found, however, that the emulsions (and thus the binder systems) of the prior art are ineffective with certain glass fibers, e.g., made by the process described in U.S. Patent 2,489,243 and hereinafter, using glasses generally of the type described in U.S. Patent 2,640,784, because the surface alkalinity of the glass from which fibers are produced by this method prevents the emulsified silicone oil in the binder from reverting to its non-emulsified state (and thereby prevents the oil from reacting with the fibers to form a moisture repellent surface). A reason why this phenomenon occurs is subsequently suggested. The composition of glasses of the type described in U.S. Patent 2,640,784, as subsequently discussed in more detail, is such that sodium and other alkaline ions preferentially appear on the surface of the glass fibers.

A new binder composition has now been discovered which allows emulsified silicone oils in aqueous binder compositions to be applied to glass fibers of the composition described in U.S. Patent 2,640,784 and made by said process (described hereinafter) to produce a moisture repellent glass fiber insulation.

It is an object of this invention to provide improved glass fiber insulation.

It is a further object of this invention to provide glass fiber insulation having improved moisture repellent characteristics.

It is also an object of this invention to provide a method for producing a moisture repellent glass fiber insulation.

It is a still further object of this invention to provide new and improved binder compositions to bond glass fibers together in mats which provide improved moisture repellence.

Other objects and benefits of this invention will appear from the description to follow, reference being made to the attached drawing, which is a partially schematic diagram showing the production of glass fibers by the method to which reference has been made.

In accordance with the present invention, it is now possible to produce glass fiber insulation mats and boards which possess improved moisture repellent properties.

As is well known by those skilled in the art, glass fiber insulation mats or boards are conventionally made by taking extremely fine glass fibers and binding them together in the form of a mat or board with an inorganic or organic based binder composition. Usually, it is necessary to cure the organic binder by heat treatment after it has been applied in order to "set" the binder; however, when inorganic binders are used this is not always essential since drying will occur under ambient conditions.

The glass fibers used to form the glass fiber insulation of this invention can have the composition set forth in U.S. Patent 2,640,740 and are preferably formed by the process which is described in U.S. Patent 2,489,243, Stalego. This process can be fully understood by reference to the following detailed description.

Referring to the drawing there is shown at 10 a pot of molten glass from which primary fibers 12 are attenuated from a bushing 11 through orifices 13 by drawing rolls 14 which can be driven by any suitable means. These fibers pass between guide rolls 15, 16 and 17 and over the grooved surface 19 of a guide plate 18. At the lower end of the plate 18, the fibers feed into a high speed gaseous blast 22 issuing directly from the discharge slot 21 of a high velocity gas burner 20. The blast is so intensely hot that as the fibers move into the blast they are melted and the molten glass is drawn out by the force of the blast into fine glass fibers.

The fibers attenuated and blown by the gaseous blast are collected at 23 on a moving formainous belt 24 with the assistance of a vacuum system, a portion of which is indicated at 25. The illustrated collective equipment and the power means therefor are conventional and accordingly are not set forth in detail in the schematic illustration.

Before the fibers are collected and moved laterally in the direction indicated by the arrows, they may be sprayed with water from sprayheads 26 and are sprayed with the binder solutions of the present invention, later defined, from sprayheads 27. The water spray from sprayheads 26 is used, if required, to prevent unduly high temperature in the process. Most of the water from the sprayheads 26, and from the binder introduced through the sprayheads 27, is removed by evaporation due to heat produced by the gas burner 20. The binders of this invention on the belt 24, are tacky and adhere to the glass fibers. Moreover, the viscosity of the binder is sufficiently high on the belt 24 to prevent the binder from being drawn from the fibers by suction applied, e.g. by the vacuum system 25.

The fine fibers are conveyed from the collecting belt 24 onto a lower foraminous belt 28 which coacts with an upper foraminous belt 29 to compress the resin impregnated fibers to any desired degree. The fibers are carried between belts 28 and 29 through a drying and curing oven 30 which has a lower temperature zone A and a higher temperature zone B. Both belts 28 and 29 can be set to control and vary the thickness of a resin bonded glass fiber insulation material passing therebetween. This is done by conventional means (not shown) such as spring biasing the roller upon which the conveyor belts are mounted by biasing springs against the central shaft mountings of the conveyor driving rollers.

A belt 31 carried, in part, by an idler roll 32 can be provided to receive the web or board 33 of glass fibers from the discharge end of the oven 30. A relatively high density insulation product 33 existing in "board" form on the belt 31 can be passed immediately to suitable cutting devices (not shown); also, prior to or following the cutting thereof the glass fiber insulation board can be laminated to a base sheet, such as a heat resistant sheet or fabric, which can serve as an ultimate facing sheet therefor when the insulation board is installed in place.

The fine, attenuated glass fibers can preferably be formed using the horizontal gaseous blast technique as described above and shown in U.S. Patent 2,489,243, or can be formed by the flame centrifugal and steam centrifugal processes described in U.S. Patent 2,609,566 and U.S. Patent 2,949,632, respectively, or can be produced by the attenuation of molten streams of glass by blasts of high pressure steam or air directed angularly downward or perpendicularly onto the molten streams as they issue from a glass melting device, such as the pot 10 shown in the drawings. So long as the fibers are formed from a glass which supplies sodium or other alkaline ions on the surfaces thereof, the unexpected advantages of a binder composition according to the invention are achieved. In any event, it will be appreciated that the thickness of the fibrous layer will depend chiefly upon the rate of feed of molten glass, the number of orifices in the fiber forming system, the rate of linear travel of the normally endless collecting belt conveyor system and the height between the vertically adjustable conveyor belts 28 and 29.

A more detailed showing of the production of such continuous glass fiber products is shown and described in Slayter et al. U.S. Patent 2,206,058, or in the Simison et al. Patent 2,189,840. Preferably use is made of "Superfine" glass fibers which are formed by gaseous burner blast blown systems such as shown in the accompanying drawing. Such fibers have diameters ranging from 1 to 20 hundred thousandths of an inch and preferably range from 3 to 15 hundred thousandths of an inch.

In addition, it is preferable to apply the binder to the glass fibers as they are collected on a deposition surface such as a belt or conveyor since the individual fibers are more readily coated. However, use may also be made of previously formed continuous glass fibers cut or chopped to shorter lengths; or use can be made of continuous glass fibers and yarns of endless lengths which are deposited in swirl patterns and the like. Such continuous fibers may be used alone or in combination with the "glass fiber wool" or staple type glass fibers in the formation of mats and boards for use with thermosetting binders in the manufacture of insulation products.

The binder may be applied in any suitable way to the fibers such as by dipping a mass of loose fibers or bodies of interbonded fibers into solutions or dispersions of the binder to apply same to the glass fibers in amounts sufficient to thoroughly impregnate the fibers.

In the preferred practice of this invention the binder composition described hereafter is applied to glass fibers having the composition described in U.S. Patent 2,640,784 and made by the process described above and wherein the fibers have an average diameter of about 0.00004 inch, and the finished products may have apparent densities ranging from less than 1 pound per cubic foot to as high as 30 to 40 pounds per cubic foot. The binder content preferably constitutes from about 2% to 35% by weight of the finished product in a cured state. The above described glass fiber mat is substantially the same as is sold by the Owens-Corning Fiberglas Company, Toledo, Ohio, under the trade name Aerocor AA, with the exception of a different binder composition.

In accordance with this invention a glass fiber insulation product is provided having greatly improved moisture repellant characteristics. This improved product will first be described relative to a specific embodiment thereof in the following example, which is presented solely for the purpose of illustrating and disclosing the invention, and is not to be construed as limiting.

EXAMPLE

A 300 gallon mixing tank provided with a propeller-type agitator was charged with 125 gallons of soft water, and the water and subsequently charged ingredients were stirred during the formulation of a binder composition according to the invention. The following ingredients were than charged to the tank: a 10.2 gallon portion of isopropyl alcohol, a 66.8 pound portion of a phenol-formaldehyde resin having 48% [1] solids, a 30.6 pound portion of a urea-formaldehyde resin having 45% solids. Stirring was continued for a few minutes before charging an 8.8 gallon portion of an emulsion [2] of a dimethylsiloxane fluid (500 centistokes), and 96 gallons of water. Mixing was continued for an additional 10 minutes after completion of the additions. The final volume of the binder was 250 gallons and the total solids content was 2.83%.

The binder composition produced as described in the preceding example was sprayed with glass fibers [3] attenuated by the process as previously described with reference to the drawings onto the collecting belt 24. The glass fibers and associated binder were then formed into mats and boards by selectively regulating the speed of movement of the fiber collection belt 24, and regulating the distance between the upper belt 29 and the lower belt 28, and curing them at about 450° F. for approximately 5 minutes. The completed materials were then subjected to a series of tests to measure their degree of moisture repellency.

The dimethylsiloxane polymer emulsion used in the preceding example was formed by rapid stirring; first charged were 30 parts purified kerosene and 30 parts dimethylsiloxane polymer (500 centistokes), followed by 6 parts N-alkyl trimethylene diamine,[4] and 3 parts con- ---
[1] The terms "percent" and "parts" are used herein and in the appended claims to refer to percent and parts by weight.
[2] Subsequently discussed.
[3] The glass from which the fibers were formed contained about 60 percent $SiO_2$, about 15 percent $Na_2O$, about 8 percent $B_2O_3$, and about 5 percent $Al_2O_3$, balance mainly CaO and MgO.
[4] The specific diamine used is available under the trademark "Duomeen" T; the alkyl substituent is derived from tallow, and is principally straight chain C16 and C18, with some C14, and probably minor residual unsaturation.

centrated (38%) HCl which had been diluted with 2 or 3 parts water. The stirring was continued during the slow addition of 36 parts water through the inversion from a water in oil to an oil in water emulsion. The emulsion had a solids content of 34.3%.

The above described fiber glass insulation was designed to conform to military specification MIL-B-5924B. Thus the binder was applied to the glass fibers in such a quantity that the cured binder comprised 17.5±2½% of the product. The binder was applied to glass fibers having a diameter of 0.00004±0.00001 inch, and the apparent density of the product was 0.60 lb./cu. ft.±7%.

The improved moisture repellence of the glass fiber insulation produced as described above was demonstrated by means of buoyancy tests and wicking tests. The buoyancy test was conducted as follows:

Two 10±¼ ounce specimens of the material to be tested were torn into small pieces, and the tore pieces of each specimen stuffed into separate compartments of a two compartment muslin bag. The bag was then weighed and attached to a wire frame carrying a 20 pound weight, and conforming to the shape of the muslin bag. After the muslin bag was attached to the frame, the entire apparatus was suspended on a spring scale and submerged in a water tank so that the top of the bag was 2.3 inches below the surface of the water, and thereafter weighed. The assembly did not touch the sides or bottom of the tank. At the end of 24 hours of submersion, the submerged weight of the apparatus was again measured.

Two buoyancy values were determined, the initial buoyancy and the buoyancy after 24 hours submersion. The initial buoyancy is calculated by subtracting the weight obtained immediately upon submersion from the submerged weight of the wire frame with the 20 pound weight attached, and 24 hour buoyancy is calculated by subtracting the weight of the apparatus after 24 hours submersion from the submerged weight of the wire frame with the 20 pound weight attached.

To demonstrate the improved moisture repellence of the glass fiber insulation of this invention two samples were tested, the first sample being one produced as described above, and the second a glass fiber insulation produced in the same way, and substantially identical except that ammonium oleate was used in preparing the silicone emulsion instead of the N-alkyl trimethylene diamine and the isopropyl alcohol was not incorporated in the binder composition. The results are indicated below.

Table 1

| Sample: | 24 hr. bouyancy, lb. |
|---|---|
| No. 1 | 10.75 |
| No. 2 | 1.1 |

It can be seen from the results of the foregoing test that an essentially ten fold increase in buoyancy was obtained with the glass fiber insulation of this invention having a binder system containing a dimethyl silicone fluid emulsified with the hydrochloride of an N-alkyl trimethylene diamine by comparison with a product containing a dimethyl silicone fluid emulsified with ammonium oleate in the binder system, thus demonstrating the improved moisture repellence of the glass fiber insulation of this invention.

A wicking test constitutes another method of demonstrating the effectiveness of the glass fiber insulation products of this invention in repelling moisture. In this test six 1 x 6 inch specimens of each sample to be tested are cut from a roll of the material with the 6 inch length in the direction of the roll. Six similar specimens are cut with the 6 inch length parallel to the width of the roll. Six specimens (three cut with the roll and three cut across the roll) are fastened to a grease-free 0.025 to 0.035, 4 x 4 mesh galvanized wire screen, and this assembly is positioned in an upright position in a container so that the ends of the specimens touch the bottom of the container. The specimens do not touch each other or the sides of the container. Distilled water at room temperature is poured into the container to a height of one inch.

The six remaining specimens are positioned similarly in another container, and water poured into the container to a height of 1 inch. The temperature of the water is maintained at 120±5° F. The degree of wicking is noted every 24 hours. A sample is said to "pass" if it does not become soaked above the water line, and to "fail" if it does.

Twenty separate samples of the glass fiber insulation produced as described above were tested in accordance with the above procedure wherein the water was maintained at 120±5° F. Of the twenty samples, 18 passed and 2 failed. The two which failed are believed to be the result of poor binder distribution. Similar tests with the same type of insulation, except that the binder composition contained no isopropyl alcohol and ammonium oleate was used instead of the N-alkyl trimethylene diamine to produce the silicone emulsion resulted in 0 pass, and 20 failures, thus demonstrating that the composition of this invention has greatly improved moisture repellent characteristics over those of the prior art.

The emulsifying agents suitable for use in the invention are cationic and are preferably N-alkyl trimethylene diamines wherein the alkyl group has a carbon chain of from 8 to 20 carbons. An example of such a cationic emulsifying agent is "Duomeen" T brand which is manufactured and sold by Armour & Company, Chicago, Ill. Duomeen T is derived from tallow and comprises a mixture of N-alkyl trimethylene diamines, with the alkyl groups substantially corresponding to the chain length of myristic, palmitic and stearic acids, the latter two predominating. These compounds may be formed in various ways using as starting materials the fatty acids present in tallow, palm oil, coconut oil and similar oils. The fatty acids contained therein may first be hydrogenated, followed by conversion to an ester, and formation of the amide by ammonialysis of the ester. Reduction of the amide with lithium aluminum hydride gives the corresponding N-alkyl amine. Reaction of the N-alkyl amine thus formed with acrylonitrile and subsequent hydrogenation produce the desired cationic emulsifier for the polysiloxane. The tallow, palm oil, coconut oil and equivalent oils are substantially composed of mixtures of fatty acids having from 8 to 20 carbon atoms. In general, the cationic emulsifiers which may be prepared by the method described above are amines having the general formula:

$$R-NH-(CH_2)_3-NH_2$$

where R is a substantially saturated unbranched carbon chain having from 8 to 20 carbons. These cationic amine emulsifiers for the polysiloxane are reactive with HCl and HBr to form the acid salts.

It is important that the acid salt of the amine emulsifier be present in the binder in an amount which is at least substantially equivalent to the alkali metal cations present on the surface of glass fibers which have been formed from glass batches containing a substantial portion of alkali metal oxide. At the same time, there should be sufficient emulsifier present to form a stable polysiloxane emulsion. The amount of metal cations present on the surface of the glass fibers is difficult to measure and will vary with the glass composition. Consequently, it has been found that if a sufficient amount of the acid salt of the amine is present, the final product will have the requisite degree of moisture repellence. If the final product does not have the requisite degree of moisture repellence then more of the acid salt of the amine is needed. A little experimentation with a glass of any given composition, and fiberized by any given method will readily indicate the necessary amount. The presence of the acid salt of the amine emulsifier in the binder, prior to cure, enables application of the silicone to the fibers. During cure the emulsifier is rendered ineffective as a surfactant for the silicone. The mechanism by which the emulsifier is made ineffective is not understood; volatilization and sequestration (e.g., by reaction with the glass) have been postulated. In any event, after cure, because the emulsifier is ineffective, the polysiloxane has excellent adhesion to the fibers and makes them water repellent.

It is believed that the dramatic improvement demonstrated by the foregoing data when a hydrochloride of an N-alkyl trimethylene diamine was used, according to the invention, instead of ammonium oleate can be attributed to the fugitive nature of the former and to the permanent nature of the latter. As has been indicated, the N-alkyl trimethylene diamine is not present as an effective surfactant in the final product. During cure of a product which includes an emulsion of a siloxane containing ammonium oleate as an emulsifier, the ammonium cations are probably volatilized but, when the glass fibers contain a sufficient amount of alkali metal oxides that these oxides preferentially occur at the surface of the glas, alkali metal oleates are probably formed, and remain as permanent surfactants imparting a hydrophilic nature to the fiber surfaces. It will be appreciated that cure of a product according to the invention must be at a temperature sufficiently high, and for a time sufficiently long, to render the N-alkyl trimethylene diamine hydrochloride or hydrobromide ineffective as a surfactant.

The preferred siloxane polymers for use as hydrophobing agents according to the invention include generally those polymers having repeating units of the general formulas.

(A) 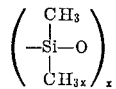

(B) 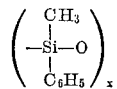

and mixtures thereof. In the above formulas, $x$ is any integer. Most desirably such fluids for use in this invention have viscosities ranging from 80 centistokes to 2,000 centistokes. The compounds designated by Formula A are known generally as dimethyl siloxane fluid polymers. They are available from the Dow Corning Corporation, Midland, Mich., as "D.C. 200 fluids" and from the General Electric Company (Waterford, Conn.) as "G.E. Silicone Oils." These silicone oils or fluids are available in viscosities which range from 0.65 centistoke to over 1,000,000 centistokes.

Methylphenylsiloxane polymers designated generally by Formula B, are available from the Dow Corning Corporation as "D.C. 510," "D.C. 550," and "D.C. 710." The numbers indicate an increasing proportion of phenyl groups, with the higher numbers having more phenyl groups than the lower numbers. The "D.C. 550" polymers are available in viscosities ranging from 100 centistokes to 150 centistokes, and the "D.C. 710" polymers are available with a viscosity of about 500 centistokes.

Of the above mentioned siloxane polymers, the dimethylsiloxane polymers are preferred, because of the greater effectiveness in providing moisture repellence and for economic reasons. The methylphenylsiloxane fluids are characterized by extreme stability at high temperatures and therefore require a higher temperature for cure. However, their use may be desired for certain high temperature applications.

Reference has previously been made to glasses wherein alkali metal oxides preferentially occur at fiber surfaces. In general, the two most effective fluxing agents usually employed in glasses which are to be fiberized are sodium oxide and boric oxide. It has been found that glass composition of a fiber is not uniform throughout a cross section, but that sodium oxide or boric oxide, whichever is the predominant flux for the particular glass, will be present to a disproportionately high percentage adjacent the fiber surface, and to a correspondingly decreased percentage interiorly. The glass composition identified in the foregoing example is one where sodium oxide predominates at fiber surfaces. If several similar glasses were prepared with progressively decreased sodium oxide contents, and correspondingly increased $B_2O_3$ contents, a glass would eventually be formulated where $B_2O_3$ would be present in a disproportionately high percentage adjacent the surface of a fiber formed therefrom. The ratio of sodium oxide to boric oxide at which this inversion occurs depends upon many factors, including what other materials are present in the glass, and their proportions. Accordingly, no numerical limits can be fixed to identify glasses wherein sodium or other alkali metal oxides preferentially appear at the fiber surfaces. By way of example, $B_2O_3$ predominates in the surfaces of fibers made from glasses of the types disclosed in U.S. Patent 2,334,961, while sodium oxide predominates in the surfaces of fibers produced from glasses of the types disclosed in U.S. Patent 2,640,784.

In the binder composition identified above the isopropyl alcohol was used to assure solubility of the phenolic resin. The use of isopropyl or another solubilizing material is preferred, and in proportions sufficient to avoid precipitation. The proportions required vary, depending upon the material used, so that numerical limits cannot be fixed. Other alcohols miscible with water to the required extent, e.g. methyl, ethyl and n-propyl, glycols and polyglycols are effective for this purpose. Ethylene and propylene glycols are preferred glycol solubilizers.

It will be appreciated that, apart from the identity of the emulsifying agent, and the preferred use of isopropyl alcohol or another solubilizing material, all of the constituents of a binder composition used in preparing glass fiber products according to the invention are conventional, and perform conventional functions. The use, according to the invention, of an emulsifying agent selected from a certain family does not affect the performance of the other binder constituents, which can, therefore, be used in conventional proportions and to perform conventional functions. For example, in the binder composition identified above the phenolic resin is the principal binder, and bonds fibers to one another at points of contact, while the urea formaldehyde resin increases the resistance of the binder to elevated temperatures, and the siloxane imparts hydrophobicity to the fibers and to the binder. Whenever a phenolic resole is as the principal binder as in the above example used, it should have a cloud point [5] and dilutability [6] of at least 600.

It will be apparent that the various changes and modifications can be made from the specific details set forth herein without departing from the spirit and scope of the invention as defined in the appended claims.

---

[5] The condensation should be carried sufficiently far that the resole clouds when diluted with water.

[6] The dilutability of condensation products is 100 times the number of volumes of water added to one volume of the products at 60 percent solids to form a cloud at a pH of 7.1 to 7.3.

What is claimed is:

1. In a method for producing glass fiber products which includes the step of heating a mass of randomly oriented and loosely intermeshed glass fibers and an associated binder composition which includes, as a heat-curing component, a phenolic resole having a cloud point and a dilutability of at least 600 and an emulsion of a polysiloxane wherein the repeating units have the formula

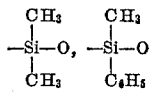

and wherein the fibers contain a proportion of alkali metal oxide sufficiently high that cations thereof preferentially occur at the fiber surfaces, the improvement of using as the polysiloxane emulsion one containing an amount of at least substantially equivalent to the alkali metal cations on the fiber surfaces of a hydrochloride or hydrobromide of at least one amine having the general formula $$R-NH-CH_2-CH_2-CH_2-NH_2$$

where R represents unbranched alkyl groups having from 8 to 20 carbon atoms.

2. In a method for producing glass fiber products which includes the step of heating a mass of randomly oriented and loosely intermeshed glass fibers and an associated binder composition which includes, as a heat-curing component, a phenolic resole having a cloud point and a dilutability of at least 600 and an emulsion of a polysiloxane wherein the repeating units have the formula

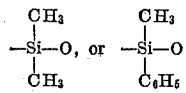

and wherein the fibers contain a proportion of alkali metal oxide sufficiently high that cations thereof preferentially occur at the fiber surfaces, the improvement of using as the polysiloxane emulsion one containing an amount at least substantially equivalent to the alkali metal cations on the fiber surfaces of a hydrochloride of at least one amine having the general formula $$R-NH-CH_2-CH_2-CH_2-NH_2$$

where R represents unbranched alkyl groups having from 8 to 20 carbon atoms.

3. In a method for producing glass fiber products which includes the step of heating a mass of randomly oriented and loosely intermeshed glass fibers and an associated binder composition which includes, as a heat-curing component, a phenolic resole having a cloud point and a dilutability of at least 600 and an emulsion of a dimethyl polysiloxane, and wherein the fibers contain a proportion of alkali metal oxide sufficiently high that cations thereof preferentially occur at the fiber surfaces, the improvement of using as the dimethyl polysiloxane emulsion one containing an amount at least substantially equivalent to the alkali metal cations on the fiber surfaces of a hydrochloride of at least one amine having the general formula $$R-NH-CH_2-CH_2-CH_2-NH_2$$

where R represents unbranched alkyl groups having from 8 to 20 carbon atoms.

4. In a method as claimed in claim 3, the improvement wherein the hydrochloride is of an amine wherein R represents predominantly a mixture of alkyl groups of 14, 16 and 18 carbon atoms.

References Cited

UNITED STATES PATENTS

| | | | |
|---|---|---|---|
| 2,854,424 | 9/1958 | Solomon et al. | 260—826 |
| 2,891,920 | 6/1959 | Hyde et al. | 260—29.2 |
| 3,032,442 | 5/1962 | Roth | 260—826 |

MORRIS LIEBMAN, Primary Examiner

L. T. JACOBS, Assistant Examiner

U.S. Cl. X.R.

260—37, 826